US006363418B1

United States Patent
Conboy et al.

(10) Patent No.: US 6,363,418 B1
(45) Date of Patent: Mar. 26, 2002

(54) ON-LINE IMAGE CACHING CONTROL FOR EFFICIENT IMAGE DISPLAY

(75) Inventors: Garth Conboy, La Jolla; Brady Duga; William S. Leshner, both of Carlsbad; Aleksey Novicov, Palo Alto; James Sachs, Menlo Park, all of CA (US)

(73) Assignee: Softbook Press, Inc., Menlo Park, CA (US)

( * ) Notice: Subject to any disclaimer, the term of this patent is extended or adjusted under 35 U.S.C. 154(b) by 0 days.

(21) Appl. No.: 09/173,866

(22) Filed: Oct. 16, 1998

(51) Int. Cl.[7] .............................................. G06F 15/16
(52) U.S. Cl. ........................ 709/218; 709/203; 709/217; 709/219; 709/229; 707/10; 707/513
(58) Field of Search ................................ 709/200–203, 709/217–219, 223, 228–229, 245–246; 707/10, 2, 102–104, 513; 345/335, 339, 350, 112, 115, 127

(56) References Cited

U.S. PATENT DOCUMENTS

| | | | |
|---|---|---|---|
| 3,718,906 A | 2/1973 | Lightner | 379/77 |
| 4,159,417 A | 6/1979 | Rubincam | 235/375 |
| D276,626 S | 12/1984 | Lockwood | |
| 4,490,810 A | 12/1984 | Hon | 463/43 |
| 4,545,023 A | 10/1985 | Mizzi | 708/143 |

(List continued on next page.)

FOREIGN PATENT DOCUMENTS

| | | | | |
|---|---|---|---|---|
| EP | 0 390 611 | 3/1990 | ............ | G06F/15/02 |
| EP | 0813159 A2 | 12/1997 | ............ | G06F/17/30 |
| FR | 2 657 451 | 1/1990 | ............ | G06F/15/40 |
| FR | 2 657 187 | 7/1991 | ............ | G09G/3/20 |
| GB | 2 149 544 | 6/1995 | ............ | G06F/3/147 |
| WO | WO 87/01481 | 3/1987 | ............. | G06F/3/06 |
| WO | WO 89/05023 | 6/1989 | ............ | G09G/1/16 |
| WO | WO 97/20274 | 6/1997 | ........... | G06F/15/02 |

OTHER PUBLICATIONS

Goldberg, K. et al., Beyond the Web: manipulating the real world, 1995, pp. 209–219, Elsevier Science B.V., North Holland.

Dvorak, et al., Methodology for User Centred Link Structures for Textbook to Hypertext Conversion, IEEE, Jan. 1992, pp. 619–628.

Pobiak Adjustable Access Electronic Books, IEEE, Jan. 1992, pp. 90–94.

Ramos Making Book on Electronic Books, College Store Journal—Sep./Oct. 1992.

Cox Technology Threatens to Shatter the World of College Textbooks The Wall Street Journal—Electronic Campus, Jun. 1, 1993.

(List continued on next page.)

Primary Examiner—Zarni Maung
Assistant Examiner—Bharat Barot
(74) Attorney, Agent, or Firm—Townsend and Townsend and Crew LLP

(57) ABSTRACT

A method for on-line controlling caching of an image on a viewing device to efficiently display the image on the viewing device. The method comprises the following steps: (a) sending from a server to the viewing device an image tag included in a hypertext language code, the image tag having attributes, the attributes specifying the image; (b) parsing the hypertext language code including the image tag; (c) searching for a copy of the image in a cache memory of the viewing device using the image tag attributes; (d) displaying the copy of the image if the copy of the image is found in the cache memory and is current; (e) fetching the image from the server if the copy of the image is not found in the cache memory or if the copy of the image is not current; and (f) storing the fetched image and the image tag attributes in the cache memory.

12 Claims, 3 Drawing Sheets

U.S. PATENT DOCUMENTS

| | | | |
|---|---|---|---|
| 4,575,621 A | 3/1986 | Dreifus | 235/380 |
| 4,591,974 A | 5/1986 | Dornbush et al. | 707/509 |
| 4,597,058 A | 6/1986 | Izumi et al. | 711/115 |
| 4,601,011 A | 7/1986 | Grynberg | 713/184 |
| 4,649,499 A | 3/1987 | Sutton et al. | 345/419 |
| D289,777 S | 5/1987 | Thomas | |
| 4,682,161 A | 7/1987 | Bugg | 345/130 |
| 4,725,977 A | 2/1988 | Izumi et al. | 711/115 |
| 4,779,080 A | 10/1988 | Coughlin et al. | 345/157 |
| 4,820,167 A | 4/1989 | Nobles et al. | 434/336 |
| 4,855,725 A | 8/1989 | Fernandez | 345/173 |
| 4,899,292 A | 2/1990 | Montagna et al. | 707/501 |
| 4,916,441 A | 4/1990 | Gombrich | 345/169 |
| 4,918,632 A | 4/1990 | York | 361/680 |
| 4,972,496 A | 11/1990 | Sklarew | 382/187 |
| 4,985,697 A | 1/1991 | Boulton | 345/192 |
| 5,021,989 A | 6/1991 | Fujisawa et al. | 345/350 |
| 5,025,373 A | 6/1991 | Keyser, Jr. et al. | 705/42 |
| 5,031,119 A | 7/1991 | Dulaney et al. | 345/349 |
| 5,065,345 A | 11/1991 | Knowles et al. | 345/302 |
| 5,091,939 A | 2/1992 | Cole et al. | 713/183 |
| 5,109,354 A | 4/1992 | Yamashita et al. | 708/110 |
| 5,115,508 A | 5/1992 | Hatta | 340/825.34 |
| 5,121,492 A | 6/1992 | Saville, III et al. | 703/13 |
| 5,133,076 A | 7/1992 | Hawkins et al. | 708/141 |
| 5,146,552 A | 9/1992 | Cassoria et al. | 707/512 |
| D330,544 S | 10/1992 | Kane | |
| 5,157,491 A | 10/1992 | Kassatly | 348/15 |
| 5,157,737 A | 10/1992 | Sklarew | 345/173 |
| 5,157,783 A | 10/1992 | Anderson et al. | 707/4 |
| 5,199,104 A | 3/1993 | Hirayama | 345/350 |
| 5,203,001 A | 4/1993 | Yanagiuchi et al. | 711/100 |
| 5,214,696 A | 5/1993 | Keiser, II et al. | 707/500 |
| 5,221,838 A | 6/1993 | Gutman et al. | 235/379 |
| 5,222,136 A | 6/1993 | Rasmussen et al. | 380/266 |
| 5,226,080 A | 7/1993 | Cole et al. | 713/183 |
| 5,231,662 A | 7/1993 | van Rumpt et al. | 713/193 |
| 5,233,333 A | 8/1993 | Borsuk | 345/127 |
| 5,239,665 A | 8/1993 | Tsuchiya | 345/326 |
| D339,329 S | 9/1993 | Lacko | |
| 5,245,656 A | 9/1993 | Loeb et al. | 708/819 |
| 5,247,661 A | 9/1993 | Hager et al. | 707/104 |
| 5,253,294 A | 10/1993 | Maurer | 380/264 |
| D346,620 S | 5/1994 | McSorely | |
| 5,319,582 A | 6/1994 | Ma | 708/111 |
| 5,333,116 A | 7/1994 | Hawkins et al. | 345/169 |
| 5,339,091 A | 8/1994 | Yamazaki et al. | 345/104 |
| 5,359,707 A | 10/1994 | Sato | 707/532 |
| 5,365,598 A | 11/1994 | Sklarew | 380/43 |
| 5,367,621 A | 11/1994 | Cohen et al. | 707/501 |
| 5,379,057 A | 1/1995 | Clough et al. | 345/173 |
| 5,388,196 A | 2/1995 | Pajak et al. | 345/329 |
| 5,392,387 A | 2/1995 | Fitzpatrick et al. | 345/350 |
| 5,398,310 A | 3/1995 | Tchao et al. | 707/541 |
| 5,404,505 A | 4/1995 | Levinson | 707/10 |
| D359,306 S | 6/1995 | Lande et al. | |
| 5,428,606 A | 6/1995 | Moskowitz | 370/400 |
| 5,438,344 A | 8/1995 | Oliva | 345/507 |
| D362,271 S | 9/1995 | Luong | |
| D362,272 S | 9/1995 | Luong | |
| D362,461 S | 9/1995 | Luong | |
| 5,457,746 A | 10/1995 | Dolphin | 705/51 |
| 5,463,725 A | 10/1995 | Henckel et al. | 345/350 |
| 5,465,213 A | 11/1995 | Ross | 700/117 |
| 5,467,102 A | 11/1995 | Kuno et al. | 345/1 |
| 5,475,399 A | 12/1995 | Borsuk | 345/130 |
| 5,477,510 A | 12/1995 | Ukita | 369/18 |
| 5,483,586 A | 1/1996 | Sussman | 379/201 |
| 5,598,470 A | 1/1997 | Cooper et al. | 713/165 |
| 5,615,264 A | 3/1997 | Kazmierczak et al. | 705/52 |
| 5,629,980 A | 5/1997 | Stefik et al. | 380/4 |
| 5,638,443 A | 6/1997 | Stefik et al. | 705/54 |
| 5,697,793 A | 12/1997 | Huffman et al. | 434/317 |
| 5,719,943 A | 2/1998 | Amada et al. | 380/202 |
| 5,734,823 A | 3/1998 | Saigh et al. | 709/229 |
| 5,734,891 A | 3/1998 | Saigh | 707/10 |
| 5,802,292 A | * 9/1998 | Mogul | 709/203 |
| 5,878,223 A | * 3/1999 | Becker et al. | 709/223 |
| 5,913,033 A | * 6/1999 | Grout | 709/219 |
| 5,918,013 A | * 6/1999 | Mighdoll et al. | 709/217 |
| 5,946,697 A | * 8/1999 | Shen | 709/218 |
| 5,956,034 A | * 9/1999 | Sachs et al. | 345/350 |
| 5,995,102 A | * 11/1999 | Rosen et al. | 345/339 |
| 6,021,409 A | * 2/2000 | Burrows | 707/10 |
| 6,032,989 A | * 2/2000 | Cordell | 707/513 |
| 6,084,584 A | * 7/2000 | Nahi et al. | 709/203 |
| 6,122,657 A | * 9/2000 | Hoffman et al. | 709/201 |

OTHER PUBLICATIONS

Watanabe et al., Visual Interface for Retrieval of Electronic-Formed Books, IEEE, Jul. 1993, pp. 692–695.

The Heller Report, Oct. 1993.

Ziegler IBM to Unveil Plan to Skip Disks, Send Software by Satellite, The Wall Street Journal, Nov. 1, 1994.

Fisher This Little Compute rTries to be a Book, St. Louis Post–Dispatch, Jan. 4, 1995.

Steinert–Threlkeld Now, Data by Satellite, Inter@ctive Week (no date).

* cited by examiner

ON-LINE IMAGE CACHING CONTROL FOR EFFICIENT IMAGE DISPLAY

BACKGROUND OF THE INVENTION

1. Field of the Invention

The present invention relates generally to a distribution system of digital contents, i.e., digitally encoded published materials. More particularly, the invention relates to a method and a system for on-line controlling caching of an image on a viewing device to efficiently display the image on the viewing device.

2. Description of Related Art

Advances in computer and communication technology have provided to the consumers a convenient and economical means to access information in a variety of media. One particular area of information access is the electronic books. An electronic book is a viewing device that receives printed materials in the form of digital data downloaded from an information network. A user of an electronic book can read downloaded contents of books and printed materials subscribed from a participating bookstore at his or her own convenience without the need to purchase the printed copies of the books.

The World Wide Web (WWW) has now become a popular means for publishing printed materials in the open network domain. The WWW refers to the abstract cyberspace of information which is transmitted over the physical networks, such as the Internet. The WWW publishing works under a client-server model. A Web server is a program running on a server to serve documents to other computers or devices that send requests for the documents. A Web client is a program that lets the user request documents from a server. To facilitate the downloading of printed materials, the contents of these documents are typically created in a form compatible with the network transmission format. The documents sent by a server are in a hypertext language format. A popular hypertext language is the HyperText Markup Language (HTML), which is a fairly limited formatting language.

When an image is to be sent to a viewing device, the server sends the following HTML image tag:

<IMG SRC="<location>" [HEIGHT=<n>] [WIDTH=<n>]>

The image tag attribute SRC has the value <location> which specifies the location of the image at the server. The attributes HEIGHT and WIDTH which provide the image height and width information are optional.

After parsing the image tag and its attributes, the viewing device performs the following actions to obtain and display the image:

a. The viewing device opens a network connection to the location specified by the SRC attribute value.
b. The viewing device starts downloading the image.
c. Using the "modification date/time" from the supplied image file, the viewing device determines whether a locally cached copy of the image is current.
d. If there is no locally cached copy of the image, or if the locally cached version is not current, the viewer continues the image transfer and the image will be displayed (and optionally added to the local cache memory).
e. If there is a locally cached copy of the image and the modification date indicates that the cached copy is current, the viewer will then abort the image transfer and use the locally cached copy.

In the above standard procedure, the opening of the network connection and the start of the image downloading are unnecessary when a current copy of the image is already locally cached. These two potentially unnecessary actions significantly degrade the image display performance, especially on slow network connection links, such as the point-to-point protocol (PPP) link.

Therefore, currently, there is a need for a simple and efficient method to perform on-line image caching control for efficient image display using a hypertext language.

SUMMARY OF THE INVENTION

The present invention is a method for on-line controlling caching of an image on a viewing device to efficiently display the image on the viewing device. The method comprises the following steps: (a) sending from a server to the viewing device an image tag included in a hypertext language code, the image tag having attributes, the attributes specifying the image; (b) parsing the hypertext language code including the image tag; (c) searching for a copy of the image in a cache memory of the viewing device using the image tag attributes; (d) displaying the copy of the image if the copy of the image is found in the cache memory and is current; (e) fetching the image from the server if the copy of the image is not found in the cache memory or if the copy of the image is not current; and (f) storing the fetched image and the image tag attributes in the cache memory.

DETAILED DESCRIPTION OF THE INVENTION

The present invention is a method and a system for on-line controlling caching of an image on a viewing device to efficiently display the image on the viewing device.

Figure 1:
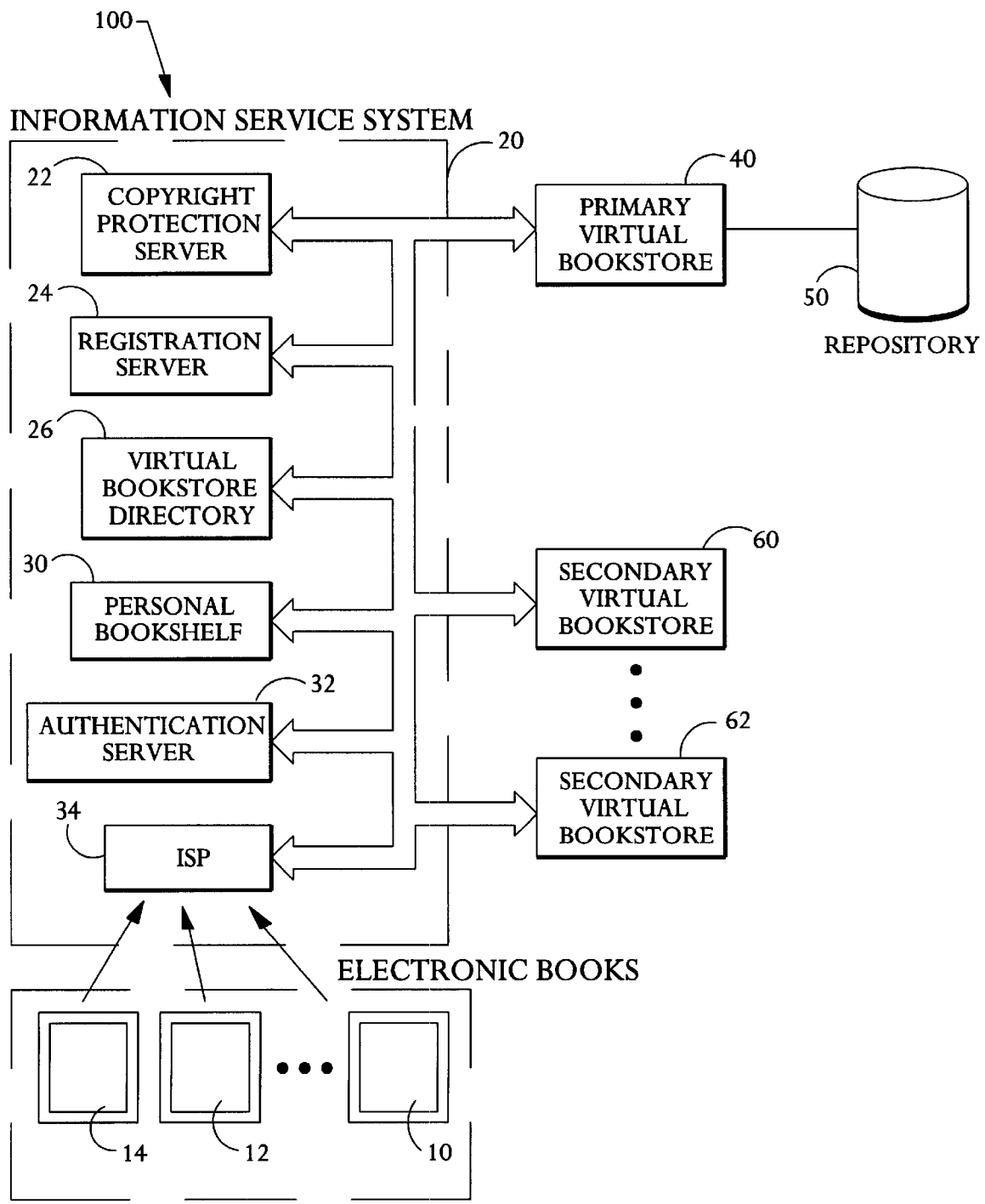
FIG. 1 is a diagram illustrating a system in which one embodiment of the invention can be practiced.

FIG. 1 is a diagram illustrating a system 100 in which one embodiment of the invention can be practiced.

Referring to FIG. 1, the system 100 comprises: (a) at least one portable electronic book 10 operative to request a digital content from a catalog of distinct digital contents, to receive and display the requested digital content in readable form; (b) an information services system 20 which includes an authentication server 32 for authenticating the identity of the requesting portable electronic book 10 and a copyright protection server 22 for rendering the requested digital content sent to the requesting portable electronic book 10 readable only by the requesting portable electronic book 10; (c) at least one primary virtual bookstore 40 in electrical communication with the information services system 20, the primary virtual bookstore being a computer-based storefront accessible by the portable electronic book and including the catalog of distinct digital contents; and (d) a repository 50, in electrical communication with the primary virtual bookstore 40, for storing the distinct digital contents listed in the catalog.

The system 100 preferably includes more than one portable electronic book 10, to be commercially viable. This is illustrated in FIG. 1 by including the portable electronic books 12 and 14. The system also preferably includes more than one primary virtual bookstore 40, each serving a different set of customers, each customer owning a portable electronic book.

The system 100 can further comprise a secondary virtual bookstore 60 in electrical communication with the information services system 20. In this case, the information services system 20 also includes a directory of virtual bookstores 26 in order to provide the portable electronic book 10 with access to the secondary virtual bookstore 60 and its catalog of digital contents.

The information services system 20 can optionally include a notice board server for sending messages from one of the virtual bookstores, primary or secondary, to a portable electronic book in the system.

The information services system 20 also includes a registration server 24 for keeping track of the portable electronic books that are considered active accounts in the system and for ensuring that each portable electronic book is associated with a primary virtual bookstore in the system. In the case where the optional notice board server is included in the information services system 20, the registration server 24 also allows each portable electronic book user to define his/her own notice board and document delivery address.

The information services system 20 preferably comprises a centralized bookshelf 30 associated with each portable electronic book 10 in the system. Each centralized bookshelf 30 contains all digital contents requested and owned by the associated portable electronic book 10. Each portable electronic book 10 user can permanently delete any of the owned digital contents from the associated centralized bookshelf 30. Since the centralized bookshelf 30 contains all the digital contents owned by the associated portable electronic book 10, these digital contents may have originated from different virtual bookstores. The centralized bookshelf 30 is a storage extension for the portable electronic book 10. Such storage extension is needed since the portable electronic book 10 has limited non-volatile memory capacity.

The user of the portable electronic book 10 can add marks, such as bookmarks, inking, highlighting and underlining, and annotations on a digital content displayed on the screen of the portable electronic book, then stores this marked digital content in the non-volatile memory of the electronic book 10. The user can also upload this marked digital content to the information services system 20 to store it in the centralized bookshelf 30 associated with the portable electronic book 10, for later retrieval. It is noted that there is no need to upload any unmarked digital content, since it was already stored in the centralized bookshelf 30 at the time it was first requested by the portable electronic book 10.

The information services system 20 further includes an Internet Services Provider (ISP) 34 for providing Internet network access to each portable electronic book in the system.

In the system 100, the portable electronic book 10 can request and download a digital content from one of the virtual bookstores. The method of the present invention is applicable to the system 100 when images are included in the requested digital content. The present method allows the virtual bookstore to perform on-line image caching control for efficient image display on the portable electronic book using a hypertext language.

Figure 2:
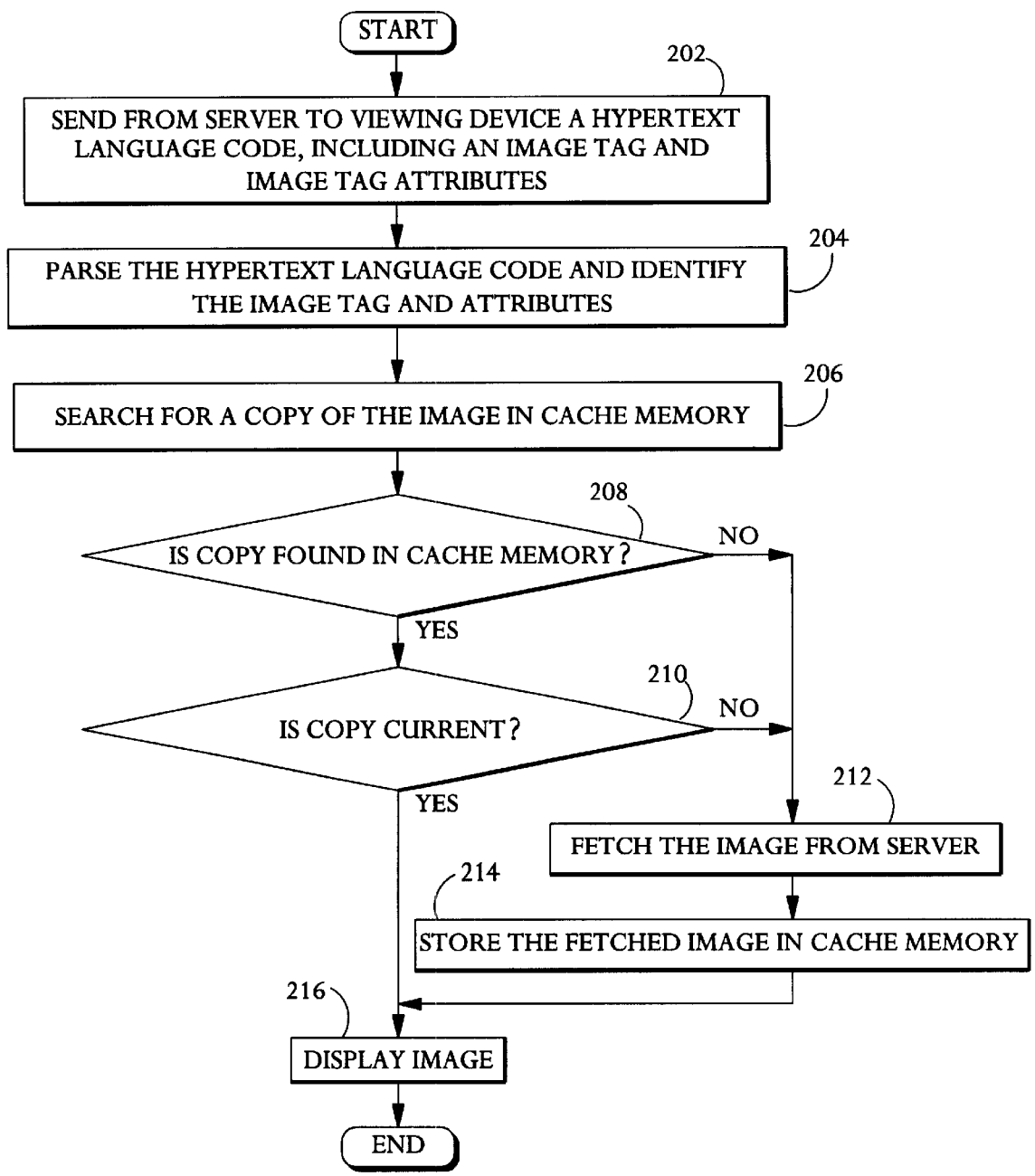
FIG. 2 is a flowchart illustrating the method of the present invention.

FIG. 2 is a flowchart illustrating the method of the present invention.

Figure 3:
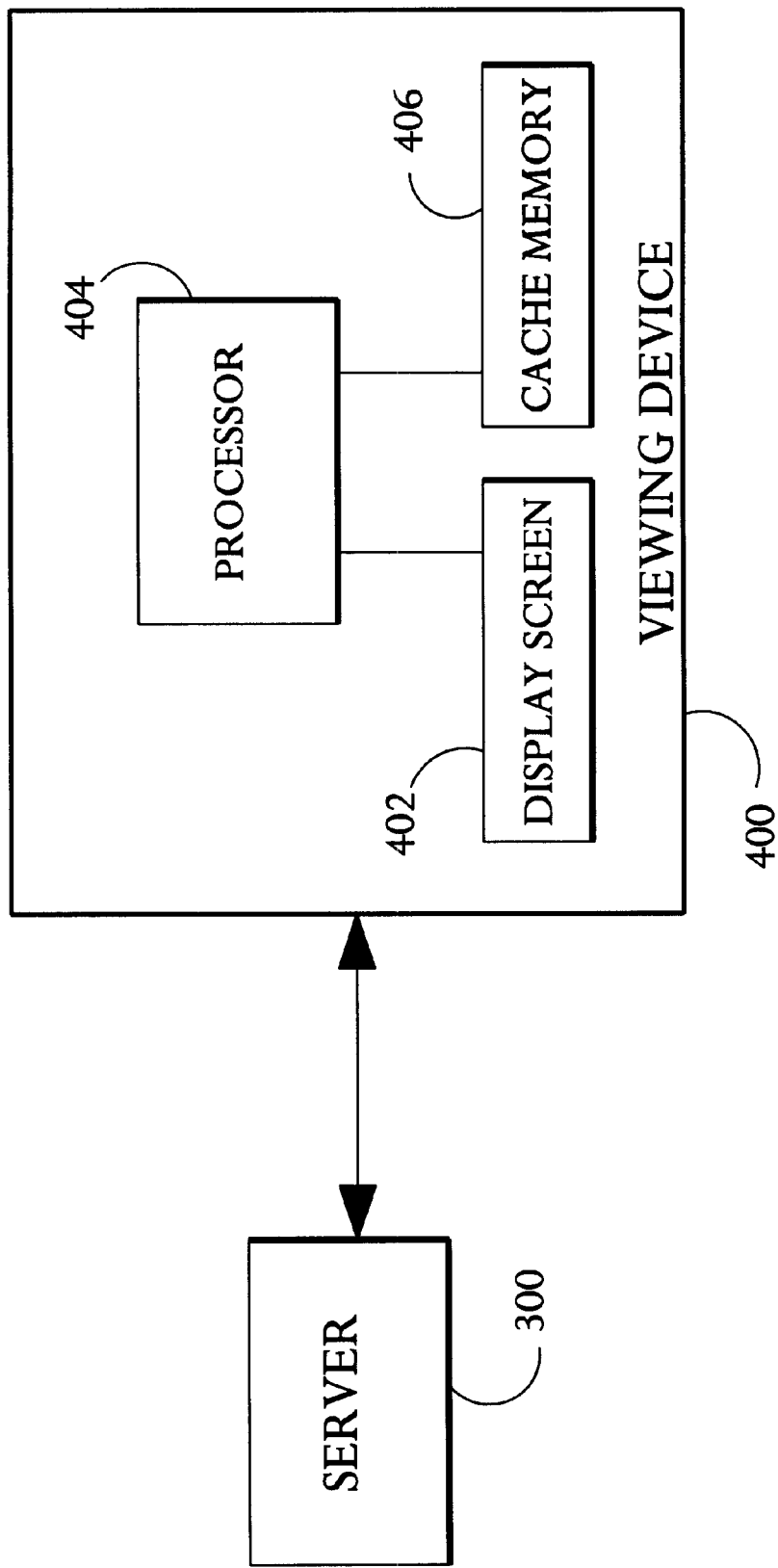
FIG. 3 is a block diagram of the system of the present invention.

FIG. 3 is a block diagram of the system of the present invention. The system includes a server 300 and a viewing device 400. The viewing device 400 includes a display screen 402, a processor 404 and a cache memory 406.

Referring to FIG. 2 and 3, after the viewing device 400 requests from the server 300 a page which includes an image, the server 300 sends to the viewing device 400 a hypertext language code which includes an image tag and image tag attributes which specify the requested image (Block 202).

In addition to the standard image tag attribute SRC which specifies the remote location of the image at the server, and optional attributes HEIGTH and WIDTH which provide information on the image height and width, the hypertext language code of the present invention also includes additional novel image tag attributes. In one embodiment of the invention, the novel image tag attributes include a LOCALTYPE to indicate the type of the requested image, a LOCALID or a LOCALNAME to specify which image of the type indicated by LOCALTYPE is to be displayed. The value of LOCALTYPE can be JPEG (JPEG file interchange), GIF (CompuServe bitmap), PICT, PNG, or any other image type. The image can be looked up by either LOCALID or by LOCALNAME. LOCALID has a numeric value, while LOCALNAME has a string value. The image tag attributes also include a LOCALSIGNATURE to indicate the age of the image. LOCALSIGNATURE can either be the modification date/time of the image or it can be an arbitrary version stamp for the image. These attributes can be specified in a hypertext language as follows:

LOCALTYPE=[PICT|GIF|JPEG|<other image type>]
[LOCALID=<n>|LOCALNAME="<name>"]
LOCALSIGNATURE=<n>

The processor 404 parses the hypertext language code and identifies the image tag and image tag attributes. (Block 204). The processor 404 then searches for a copy of the image in the cache memory 406 using the image tag attributes for identification (Block 206). In one embodiment of the invention, the processor uses the image attribute LOCALTYPE and either LOCALNAME or LOCALID to determine whether a copy of the specified image is in the cache memory 406 (Block 208).

If the copy of the image is found in the cache memory 406, then the processor 404 determines whether the copy is current (Block 210) by comparing the LOCALSIGNATURE of the specified image to the signature of the locally cached copy of the image. If the LOCALSIGNATURE and the signature of the locally cached copy of the image match, then the processor 404 displays the locally cached copy of the image (Block 216).

If a copy of the image is not found in the cache memory 406, or if the copy of the image is found but the LOCALSIGNATURE and the signature of the locally cached copy of the image do not match, then the processor 404 makes a network connection to the server to fetch the image from the server 300 using the image remote identification attribute SRC to indicate the image location at the server 300 (Block 212).

After the image is fetched, it is stored in the cache memory 406 (Block 214) using the LOCALTYPE and either LOCALNAME or LOCALID as entry keys. Both the image and the image LOCALSIGNATURE are stored in the cache memory 406. The fetched and stored image is then displayed (Block 216).

Any subsequent request for this fetched and stored image will yield matches between the image attributes and the locally cached attributes, and the cached image will be displayed without any additional required network traffic between the viewing device 400 and the server 300.

The present invention allows a viewing device 400, such as an electronic book or a Web browser, to quickly determine the location of an image, which is included in a requested page, without the need for any additional network traffic and thus increases display efficiency.

The present invention can be practiced in the system 100 of FIG. 1. In this case, the system for on-line controlling the caching of an image includes a virtual bookstore 40 (or 60, 62) as the server and a portable electronic book 10 (or 12, 14) as the viewing device.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed is:

1. A method for on-line controlling caching of an image in a cache memory on a viewing device to efficiently display the image on the viewing device, the method comprising the steps of:

(a) sending from a server to the viewing device an image tag and one or more separate image tag attributes included in a hypertext language code, the image tag specifying the image on the server and the one or more separate image tag attributes specifying the image in the cache memory;

(b) parsing the hypertext language code including the image tag and one or more separate image tag attributes;

(c) searching for a copy of the image in a cache memory of the viewing device using the one or more separate image tag attributes;

(d) displaying the copy of the image if the copy of the image is found in the cache memory and is current;

(e) fetching the image from the server using the image tag if the copy of the image is not found in the cache memory or if the copy of the image is not current; and (f) storing the fetched image and the one or more separate image tag attributes in the cache memory.

2. The method of claim 1 wherein the image tag attributes include a local identification, the local identification facilitating the search for a copy of the image in the cache memory of the viewing device.

3. The method of claim 2 wherein the local identification has a numeric value or a string value.

4. The method of claim 1 wherein the image tag attributes include an image type, the image type having a value.

5. The method of claim 4 wherein the image type value includes one of the values PICT, GIF, and JPEG.

6. The method of claim 1 wherein the image tag attributes include an image signature, the image signature having a first value.

7. The method of claim 6 wherein in step (d) the copy of the image found in the cache memory has a copy signature, and wherein the copy of the image is current if the copy signature has a second value equal to the first value of the image signature.

8. The method of claim 6 wherein the image signature first value is a modification date/time of the image or a version stamp of the image.

9. The method of claim 1 wherein the image tag attributes include a remote identification, the remote identification having a value facilitating fetching of the image from the server.

10. A system for on-line controlling caching of an image in a cache memory on a viewing device to efficiently display the image on the viewing device, the system comprising:

(a) a server in electrical communication with the viewing device, the server sending to the viewing device a hypertext language code including an image tag and one or more separate image tag attributes, the image tag specifying the image on the server and the one or more separate image tag attributes specifying the image in the cache memory; and (b) the viewing device for viewing the image, the viewing device including:
    a display screen for displaying the image;
    a cache memory;
    a processor coupled to the cache memory and the display screen, the processor parsing the hypertext language code including the image tag and the one or more separate image tag attributes, searching for a copy of the image in the cache memory using the one or more separate image tag attributes, displaying the copy of the image if the copy of the image is found in the cache memory and is current, fetching the image from the server using the image tag if the copy of the image is not found in the cache memory or if the copy of the image is not current, and storing the fetched image and the one or more separate image tag attributes in the cache memory.

11. The system of claim 10 wherein the server is a virtual bookstore.

12. The system of claim 10 wherein the viewing device is a portable electronic book.

* * * * *